United States Patent [19]
Mochizuki et al.

[11] Patent Number: 5,659,359
[45] Date of Patent: Aug. 19, 1997

[54] IMAGE SENSING SYSTEM WITH ELECTRONIC SHUTTER AND EQUAL FIELD EXPOSURE TIMES IN FRAME READOUT MODE

[75] Inventors: Teruhiko Mochizuki; Hiroshi Ueno, both of Tokyo, Japan

[73] Assignee: Sony Corporation, Tokyo, Japan

[21] Appl. No.: 375,279

[22] Filed: Jan. 19, 1995

Related U.S. Application Data

[63] Continuation-in-part of Ser. No. 136,869, Oct. 18, 1993, abandoned.

[30] Foreign Application Priority Data

Oct. 19, 1992 [JP] Japan ................... 4-305992

[51] Int. Cl.$^6$ ................................... H04N 5/335
[52] U.S. Cl. .................. 348/296; 348/298; 348/317
[58] Field of Search ........................ 348/221, 230, 348/294, 296, 317, 320, 321, 322, 323, 324; H04N 5/335

[56] References Cited

U.S. PATENT DOCUMENTS

| | | | |
|---|---|---|---|
| 4,963,980 | 10/1990 | Suga et al. | 358/209 |
| 4,984,002 | 1/1991 | Kokubo | 358/213.13 |
| 5,003,398 | 3/1991 | Suzuki | 358/209 |
| 5,025,319 | 6/1991 | Mutoh et al. | 358/213.79 |
| 5,051,832 | 9/1991 | Losee et al. | 358/213.29 |
| 5,128,767 | 7/1992 | Suzuki et al. | 358/213.13 |
| 5,438,365 | 8/1995 | Yamashita et al. | 348/297 |
| 5,444,484 | 8/1995 | Yutani et al. | 348/305 |
| 5,463,421 | 10/1995 | Deguchi et al. | 348/296 |

Primary Examiner—Thai Tran
Assistant Examiner—Ngoc-Yen Vu
Attorney, Agent, or Firm—Hill, Steadman & Simpson

[57] ABSTRACT

A control circuit for a solid state image sensing device which is capable of reading out signal charges in a field storage system and frame storage system and is provided with an electronic shutter for controlling a signal charge storage time in accordance with a shutter pulse for discharging the charges. A time lag is provided between timings of readout gate pulses in each field period for pixels of odd and even rows in a field storage system. A storage time adjusting circuit is provided for correcting the time lag between the signal charge storage times for the pixels in the even and odd rows when the signal charges are read out in the frame storage system. Thus, it is possible to prevent generation of flicker causes by a change in signal charge storage time due to the time lag in each field period between the readout gate pulses for the even field and the odd field in reading out the signal charges in the frame storage system.

16 Claims, 5 Drawing Sheets

5,659,359

IMAGE SENSING SYSTEM WITH ELECTRONIC SHUTTER AND EQUAL FIELD EXPOSURE TIMES IN FRAME READOUT MODE

This is a continuation-in-part of application Ser. No. 08/136,869, filed Oct. 18, 1993, now abandoned.

BACKGROUND OF THE INVENTION

1. Field of the Invention

The present invention relates to a control circuit for a solid state image sensing device, and more particularly to a control circuit for a solid state image sensing device which is capable of reading out signal charge in either field storage system or frame storage system and is provided with an electronic shutter for controlling a signal charge storage time (i.e., exposure time) by shutter pulses for discharging charges, in which timings of readout gate pulses within each field period are offset from each other between pixels in even rows and pixels in odd rows upon readout in the field storage system.

2. Description of the Prior Art

In general, a solid state image sensing device such as a CCD (Charge Coupled Device) is designed so that a signal charge stored in each photo sensor (pixel) within the solid state image sensing device is discharged toward an overflow drain region or a semiconductor substrate by the application of shutter pulses and an exposure time may be changed by adjusting a charge storage time in a field period by the application of the shutter pulses.

In general, the control of the charge storage time by the shutter pulses is performed in every 1H (horizontal period) unit. This is because the timing of application of the shutter pulses is limited within a horizontal fly-back line period. The reason for the limitation of the shutter pulse application timing in the horizontal fly-back line period is that a noise is prevented from being entrained into a video signal.

Among video cameras using such solid state image sensing devices, there are some cases where such a signal charge storage time controlling function is utilized in an iris control.

Recently, such an iris control technique has been considerably developed. In order to enlarge a dynamic range in the iris control, also in a vertical blanking period, the shutter pulses may be generated until readout pulses are generated. In addition, a technique has been developed in which, in the vertical blanking period, the shutter pulse generation period is much shorter than the 1H period and the signal charge storage time is finely controlled in a unit time much shorter than the 1H period. This is proposed in, for example Japanese Patent Application No. Hei 4-235397.

Irrespective of whether or not the signal charge storage time is controlled by the shutter pulses, there are two systems, i.e., a field storage system and a frame storage system for reading out signal charges of an interline type solid state image sensing device. In the frame storage system, in an odd field, signal charges of pixels in odd rows of every two rows in the vertical direction in a period of field shift are transferred to vertical transfer registers, and subsequently, a line shift is effected so that the signal charges of pixels in the odd rows are read out in order from the output end. Meanwhile, the signal charges are stored in pixels in even rows, and subsequently, in an even field, the signal charges of the pixels in the even rows are transferred to the vertical transfer registers. Then, the line shift is effected so that the signal charges of the respective pixels in the even rows are read out in order from the output end.

In contrast, in the field storage system, for example, in the odd field, signal charges of pixels of the odd row counted from the horizontal transfer registers and the next, i.e., even row are simultaneously read out so that the signal charges in a pair of upper and lower pixels are mixed and transferred in the vertical transfer registers, whereas in the even field, a combination of rows to be mixed in the vertical transfer registers is made different from that in the odd field case, so that signal charges of pixels of the even row counted from the horizontal transfer registers and the next, i.e., odd row are mixed and transferred in the vertical transfer registers.

In such a field storage system, it is possible to read out the signal charges of all the pixels in the image sensing region in every field.

The field storage system and the frame storage system have merits and demerits. For this reason, there are many solid state image sensing devices in which the storage systems may be switched over between the field and frame storage systems.

In an overall system in which the storage system for signal charges may be switched between the field storage system and the frame storage system, in the frame storage, as shown in FIG. 5, the readout pulse generation timing in the even field is different from that in the odd field in each field period, and as a result, there is a time lag in signal charge storage time to generate flickers.

This problem will be explained in more detail.

Namely, the readout of the signal charges to the vertical transfer registers from the respective photo sensitive elements (sensors) each of which constitutes a pixel in the solid state image sensing device is performed by much more increasing a potential well of the vertical transfer registers than the vertical transfer registers is normally operated. Incidentally, the potential well of the readout gate has to be deep during the readout operation. However, if the potential well of the vertical transfer registers is made deeper by the readout gate pulses kept at a high level, the potential well at the readout gate portion per se is deeper in accordance with the change of the increase of the potential well of the registers. Accordingly, it is unnecessary to provide a special process to make the potential well of the readout gate deeper.

By the way, as described above, in the frame storage system, in each field, the signal charges are read out always only for half the pixels, whereas in the field storage system, the signal charges are read out for all the pixels in every field.

Accordingly, if in the field storage, the signal charges are all read out from all the pixels at once, as shown in FIG. 6, the potentials of a portion under a vertical transfer electrode V1 which receives ΦV1 of vertical transfer four-phase clock pulses ΦV1 to ΦV4 and a portion under a vertical transfer electrode V3 which receives ΦV3 are remarkably reduced and the ground line is subjected to this effect so that the potential of the ground line is also reduced. (Incidentally, FIG. 6 shows as if the pulses ΦV1 to ΦV4 are applied only to the transfer electrodes of the vertical transfer registers at the right side but this is for simplification and actually the pulses are applied to all the vertical transfer registers.). This is because the ratio of the vertical transfer registers to the image sensing region of the solid state image sensing device is large and when the potentials of the registers are largely varied, the entire solid state image sensing device is affected.

For this reason, even if the potentials of the vertical transfer registers are made deeper, the potentials of the image sensing region as a whole are deeper together. As a result, there is a fear that it would be difficult or impossible to read out the signal charges. Therefore, when the pulse ΦV1 is raised, the pulse ΦV3 should be lowered, whereas when the pulse ΦV3 is raised, the pulse ΦV1 should be lowered, thereby keeping the potential of the ground line constant. Therefore, during the field storage, it is necessary to somewhat offset the two readout gate pulse generation timings from each other.

Subsequently, in case of the frame storage, only the pixels in every two rows in each field are read out. Accordingly, only one readout gate pulse is generated for one field. Consequently, there is no problem even if the readout gate pulses for the odd and even fields are generated at the same time.

However, if the readout gate pulse generation timings are different between the field storage and the frame storage, it is necessary to provide discretely readout gate pulse generation circuits for the field storage and the frame storage. Accordingly, the same readout gate pulse generation circuit is used commonly for the field storage and the frame storage to generate the readout gate pulse.

As a result, the generation timings within the fields are offset between the readout pulse for the even rows and the readout pulse for the odd rows during the frame storage. The reason why this causes the generation of flicker will be explained with reference to FIG. 5.

As described above, during the frame storage, the readout of the signal charges from the pixels is effected only for one of the odd row and the even row in each field period. However, since the readout gate pulse generation is effected by the same circuit for both the field storage and the frame storage, the readout gate pulse generation timings between the odd field and the even field in each field period are offset by Ta.

In contrast, the timings of shutter pulse Vsub are kept unchanged between the odd field and the even field. Accordingly, even if the same signal charge storage time is assigned, a time lag Ta in signal charge storage time between the final shutter pulse Vsub1 and the subsequent readout gate pulse is generated between the odd field and the even field. This of course causes a difference in brightness to generate the flicker.

However, the time lag Ta is actually about one millionth second, for example. Accordingly, under the condition that the signal charge storage time is relatively long, the difference in the signal charge storage time of one millionth second is essentially negligible. In this case, there is no visible flicker. On the other hand, when the signal charge storage time is short, the time lag Ta causes a remarkable change in brightness between the odd field and the even field. In particular, in a solid state image sensing device in which a shutter pulse is generated even in a vertical blanking period, and in addition, the shutter pulse generation period in the vertical blanking period is much shorter than the 1H period so as to ensure a super high speed shutter effect, the shorter the storage time (exposure time), the more the flicker will be generated to reduce the quality of the image would remarkably deteriorate. Therefore, in this case, a problem that the flicker will be generated during the frame storage could not be negligible.

SUMMARY OF THE INVENTION

An object of of the present invention is to provide a control circuit for a solid state image sensing device which is capable of reading out signal charges in a field storage system and frame storage system and which is provided with an electronic shutter for controlling a signal charge storage time (exposure time) in accordance with a shutter pulse for discharging the charges, wherein a time lag is provided between timings of readout gate pulses in each field period for pixels of odd and even rows in a field storage system. A storage time adjusting circuit is provided for correcting the time lag between the signal charge storage times for the pixels in the even and odd rows when the signal charges are read out in the frame storage system. Thus, it is possible to prevent generation of flicker causes by a change in signal charge storage time due to the time lag in each field period between the readout gate pulses for the even field and the odd field in reading out the signal charges in the frame storage system.

According to the present invention, there is provided an image sensing system comprising: a solid state image sensing device including a plurality of rows and column of photo sensors, wherein odd rows of the photo sensors generate odd signal charges and even rows of the photo sensors generate even signal charges, and outputting means for reading out the odd and even signal charges from the photo sensors and outputting the odd and even signal charges; a readout pulse generator for generating first and second pulses in each field with a time lag therebetween; a shutter pulse generator for generating a shutter pulse; operating means a first mode for causing the outputting means to read out both the odd and even signal charges in each field, wherein the odd signal charges are read out in accordance with the first pulse, whereas the even signal charges are read out in accordance with the second pulse, and a second mode for causing the outputting means to read out only the odd signal charges in accordance with selected one of the first and second pulses in each odd field and to read out only the even signal charges in accordance with the selected pulse in each even field; and exposure time controlling means for controlling an exposure time in accordance with the shutter pulse.

The system may further comprises means for generating a mode signal representative of one of the first and second modes.

The system may further comprise selecting means for receiving the mode signal and the first and second pulses and selectively outputting first and second signals for the shutter pulse.

According to another aspect of the invention, there is provided an image sensing system comprising: a solid state image sensing device including a plurality of rows and columns of photo sensors, wherein odd rows of the photo sensors generate odd signal charges and even rows of the photo sensors generate even signal charges, and outputting means for reading out the odd and even signal charged from the photo sensors and outputting odd and even signal charges; a readout pulse generator for generating first and second pulses in each field with a time lag therebetween; a shutter pulse generator for generating first and second shutter pulses, wherein the first and second shutter pulses have substantially the same time lag therebetween as the time lag between the first and second pulses; operating means having a first mode for causing the outputting means to read out the odd and even signal charges in each field, wherein the odd signal charges are read out in accordance with the first pulse, whereas the even signal charges are read out in accordance with the second pulse, and a second mode for causing the outputting means to read out only the odd signal charges in accordance with the first pulse in each odd field and to read out only the even signal charges in accordance with the second pulse in each even field; and exposure time controlling means for controlling an exposure time in accordance with one of the first and second shutter pulses in the first mode and controlling the exposure time in accordance with the first shutter pulse in each odd field and in accordance with the second shutter pulse in each even field in the second mode.

According to still another aspect of the present invention, there is provided an image sensing system comprising: a solid state imaging device having rows and column of pixels for receiving an image and generating image signals, wherein a time lag is provided between a timing of reading out the image signals from the pixels in odd rows relative to a field period and a timing of reading out the image signals from the pixels in even rows relative to a field period; and correcting means for correcting an exposure time lag caused by the time lag.

DESCRIPTION OF THE PREFERRED EMBODIMENTS

Figure 1A:
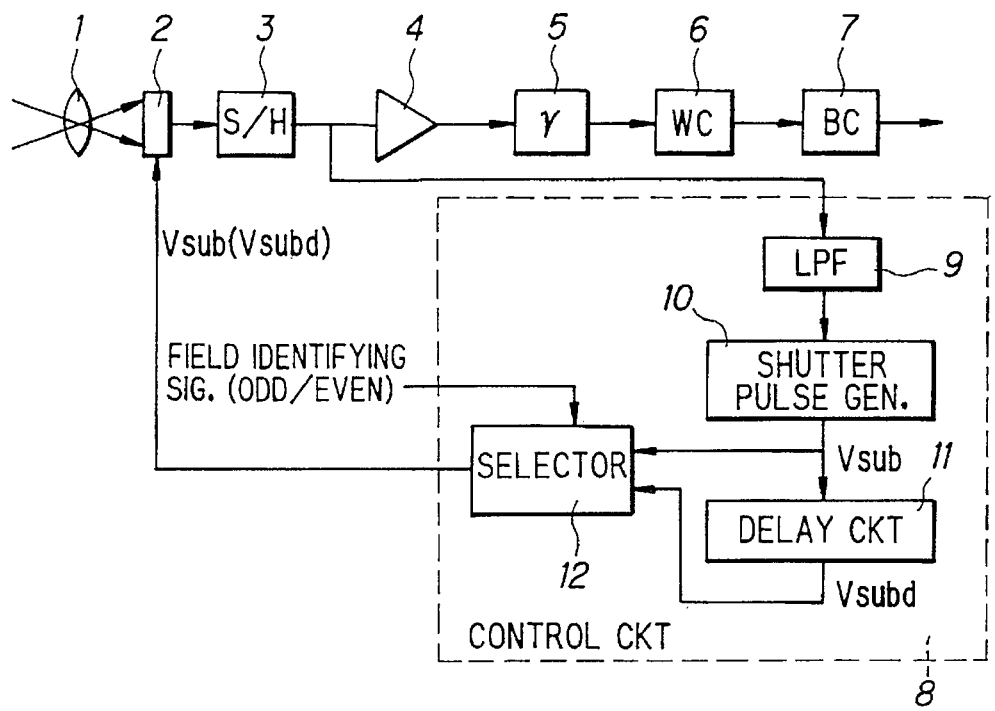
FIG. 1A is a circuit block diagram showing a control circuit for a solid state image sensing device according to an embodiment of the invention.
Figure 1B:
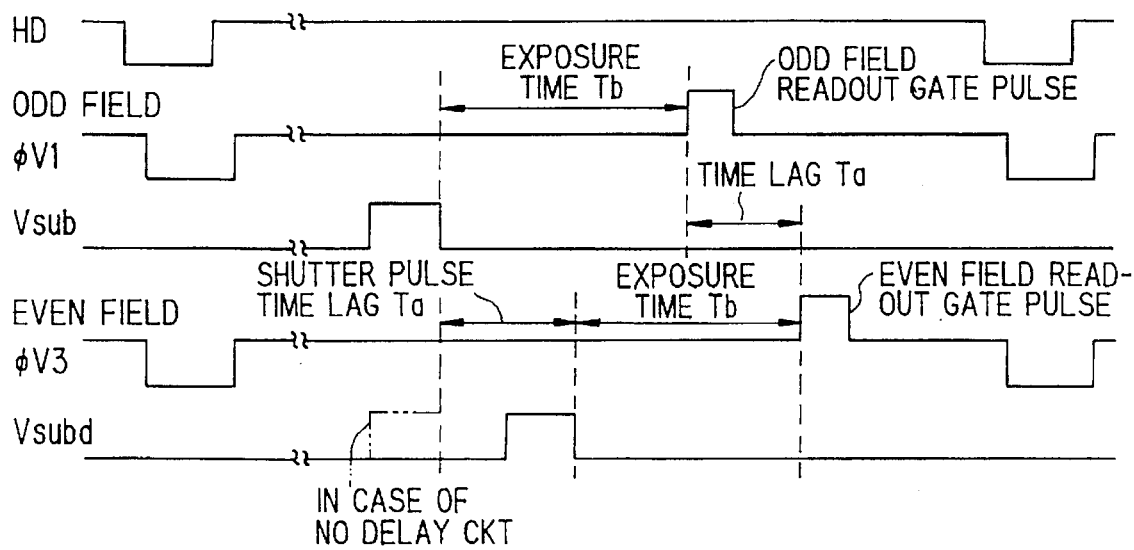
FIG. 1B is a time chart for illustrating the operation of the control circuit shown in FIG. 1A in a frame storage system.

The present invention will now be described with reference to the accompanying drawings. FIGS. 1A and 1B show a control circuit for a solid state sensing device in accordance with one embodiment of the invention. FIG. 1A is a circuit block diagram and FIG. 1B is a time chart for illustrating the operation in the frame storage.

FIGS. 1A and 1B show a lens 1, a solid state image sensing or imaging device 2, a sample hold circuit 3 for picking up an output of the solid state image sensing device 2, an AGC circuit 4, a gamma correction circuit 5, a white clip circuit 6 and a black clip circuit 7.

An iris control circuit 8 is composed of the following circuits 9 through 12. A low pass filter 9 integrates an output of the sample hold circuit 3 for detecting an overall brightness (on average) of the image field. A shutter pulse generation circuit 10 generates a shutter pulse. The shutter pulse generation circuit 10 generates the shutter pulse so that when the output of the low pass filter 9 is higher (brighter) than a reference value, a signal storage time (exposure time) Tb is kept short (i.e., to increase a shutter speed), whereas when the output of the low pass filter 9 is lower (darker) than the reference value, the signal storage time is kept long (i.e., to decrease the shutter speed).

In the conventional system, the shutter pulse outputted from the shutter pulse generation circuit 10 is sent to the solid state image sensing device 2 without any modification. However, this mode is not applied to the system according to the present invention.

A delay circuit 11 delays the shutter pulse Vsub generated from the shutter pulse generation circuit 10 by time lag Ta which is an offset amount in timing in the field between an odd field readout gate pulse and an even field readout gate pulse, and which time lag Ta is for example one millionth second.

A selector 12 receives as input signals the shutter pulse Vsub outputted from the shutter pulse generation circuit 10 and the shutter pulse Vsubd outputted from the delay circuit 11 and also receives as a control signal a field identifying signal for identifying one of the odd field and the even field. The selector 12 outputs the shutter pulse Vsub outputted from the shutter pulse generation circuit 10 when the present field is the odd field, and outputs the shutter pulse Vsub outputted from the delay circuit 11 when the present field is the even field. The output of the selector 12 is sent to the solid state image sensing device 2 as the shutter pulse Vsub (Vsubd).

The operation of the thus constructed control circuit for the solid state image sensing device will now be explained. As described above, in the case where the signal charges are read out in the field storage system, it is necessary to offset the timing between the readout gate pulse for the odd field and the readout gate pulse for the even field but in the case where the signal charges are read out in the frame storage system, it is unnecessary to offset the timing in each fields. To offset the generation timings between the field storage and the frame storage, it is necessary to provide two shutter pulse generation circuits for the field storage and the frame storage. Accordingly, even in the frame storage, the readout gate pulse generation timings in each field are offset between the field storage and the frame storage. In contrast, there is no difference in timing of generating the shutter pulses at all. Accordingly, the signal charge storage times between the odd field and the even field are offset by the offset in the generation timings of the readout gate pulses. In other words, in the field in which the readout gate pulse generation timing is earlier, the signal charge storage time is shorter than the other.

In the field in which the readout gate pulse generation timing is delayed (in the even field in case of the embodiment shown), the timing of the shutter pulse Vsub is delayed by the time Ta which is the time lag, to thereby avoid the prolongation of the signal charge storage time Tb. This is the feature of the foregoing embodiment.

Namely, in the embodiment shown, the selector 12 issues an output Vsub of the shutter pulse generation circuit without any modification in case of the odd field, whereas when the readout gate pulse is delayed, the selector 12 issues the shutter pulse Vsubd obtained by delaying the shutter pulse Vsub by the same time as the time lag.

Accordingly, the time interval between the final shutter pulse in the field and the readout gate pulse, i.e., the signal charge storage time Tb is not prolonged in the even field, and there is no change in the signal charge storage time between the odd field and the even field. Accordingly, it is possible to prevent the generation of the flicker in the frame storage.

Incidentally, the control circuit of the solid state image sensing device is so constructed that, in the field storage, the shutter pulse Vsub outputted from the shutter pulse generation circuit 10 is outputted from the selector 12 at all times, i.e., in either the odd field or the even field. Although not shown in FIG. 1, it is possible to provide a gate for allowing the field identifying signal to pass only in the frame storage and interrupt the signal in the field storage, thereby sending the output of the gate to the selector 12 as the field identifying signal.

By utilizing the fact that, in NTSC Standards and PAL Standards, due to the interlace, a drop timing of a vertical synchronizing signal VD has to be identical with a drop timing of a horizontal synchronizing signal in the odd field but these signal timings are not identical with each other in the even field, the field identifying signal is produced.

Figure 2A:
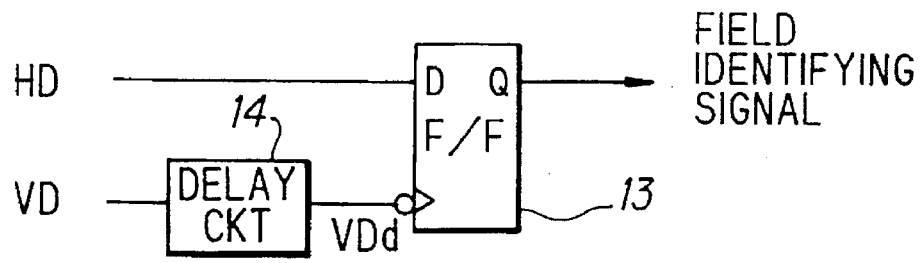
FIG. 2A is a circuit diagram showing a field identifying circuit in relation to the control circuit shown in FIG. 1A.
Figure 2B:
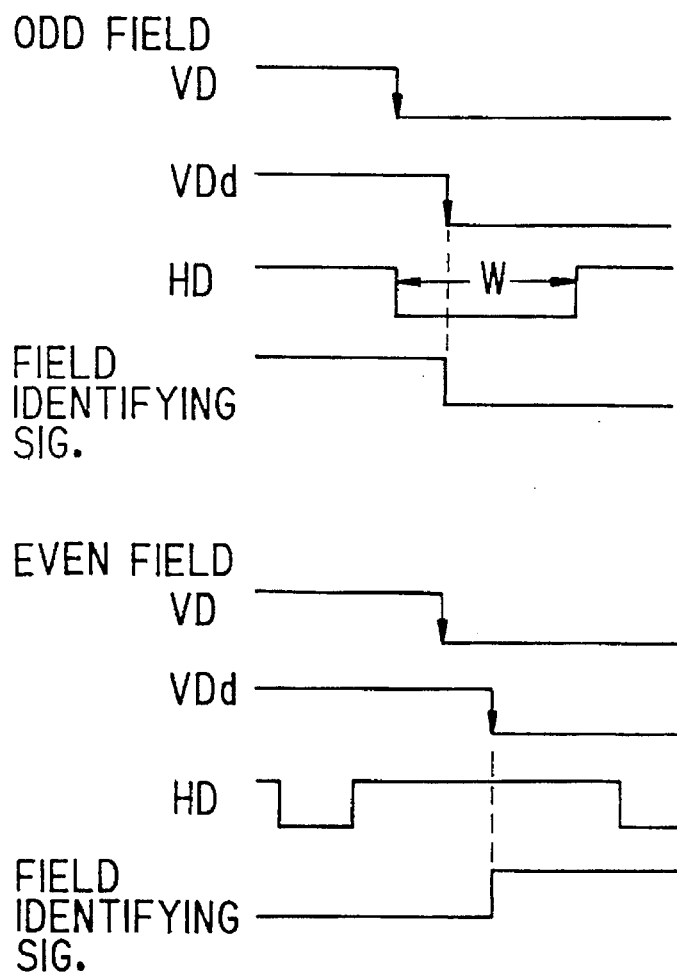
FIG. 2B is a time chart for illustrating the operation of the field identifying circuit shown in FIG. 2A.

FIGS. 2A and 2B are illustrations of the field identifying circuit. FIG. 2A is a circuit diagram and FIG. 2B is an operational time chart.

A D type flip-flop circuit 13 receives a horizontal synchronizing signal HD at its data input terminal and reverses and receives at its clock input terminal a signal VDd which is obtained by delaying a vertical synchronizing signal VD by the delay circuit 14. The output of the D type flip-flop circuit 13 is used as the field identifying signal.

As shown in FIG. 2B, in the odd field, the drop timing of the vertical synchronizing signal VD is identical with the drop timing of the horizontal synchronizing signal HD, whereas in the even field, the drop timing of the vertical synchronizing signal VD appears at a mid point between one pulse and the adjacent pulse of the horizontal synchronizing signal HD. At the mid point, the D type flip-flop circuit 13 detects whether the horizontal synchronizing signal HD is kept high or low at the drop timing of the vertical synchronizing signal VD to identify the fields.

Incidentally, if, in the odd field, the drop timing of the vertical synchronizing signal VD received by the D type flip-flop circuit 13 is not delayed from the drop timing of the horizontal synchronizing signal HD, there would be hindrance against detection of the odd field. Accordingly, the vertical synchronizing signal VD has to be delayed within a range of a pulse width W of the horizontal synchronizing signal HD. The delay circuit meets this requirement.

Figure 3A:
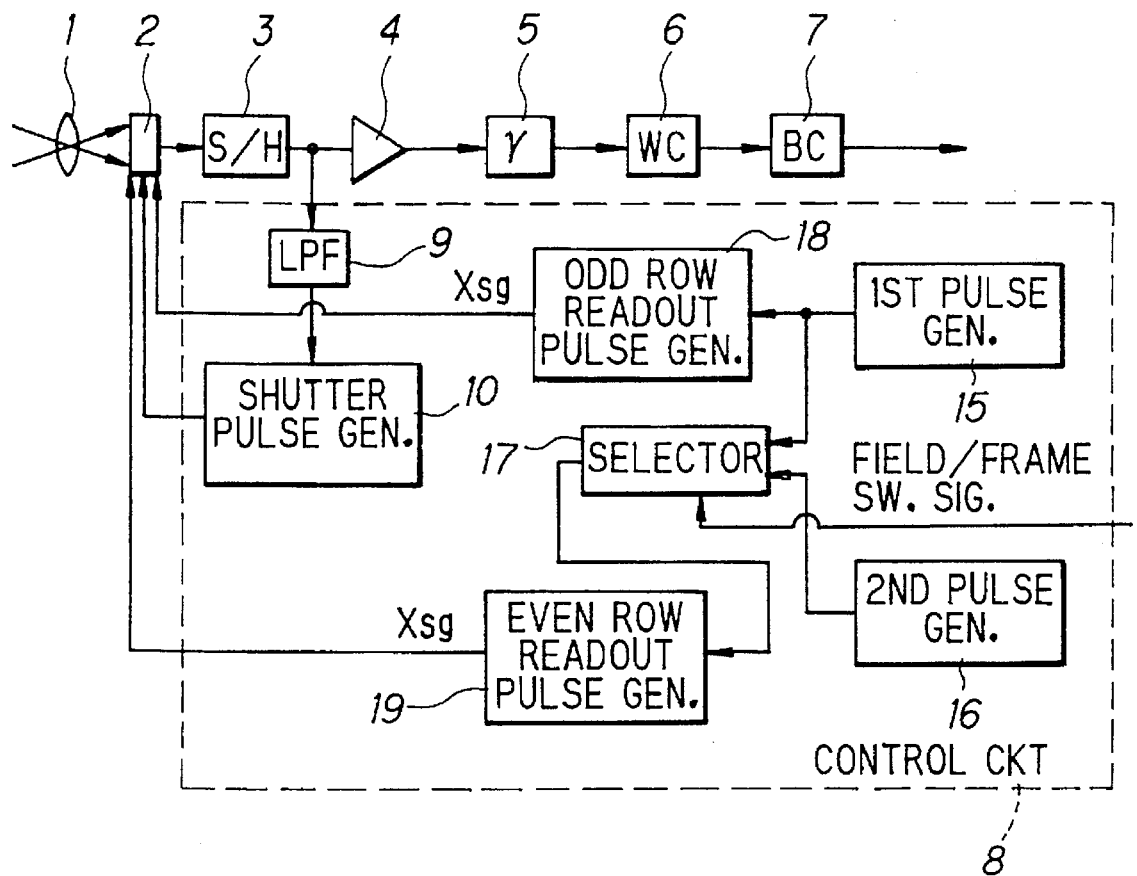
FIG. 3A is a circuit block diagram showing a control circuit for a solid state image sensing device according to another embodiment of the invention.
Figure 3B:
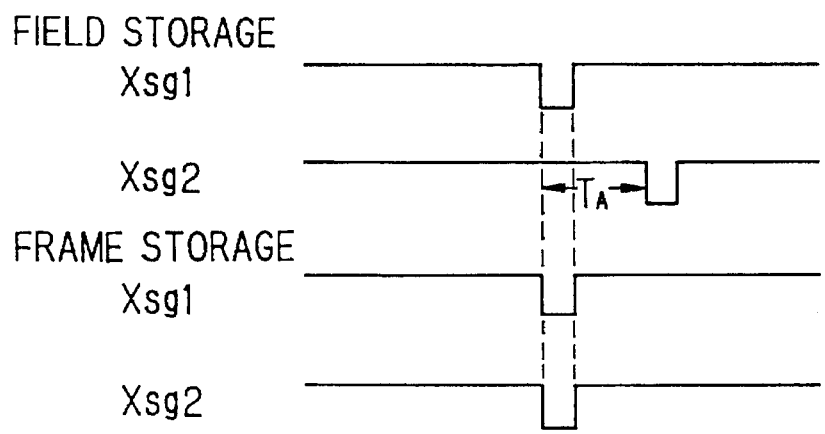
FIG. 3B is a time chart for illustrating the readout gate pulses of the control circuit shown in FIG. 3A.
Figure 4:
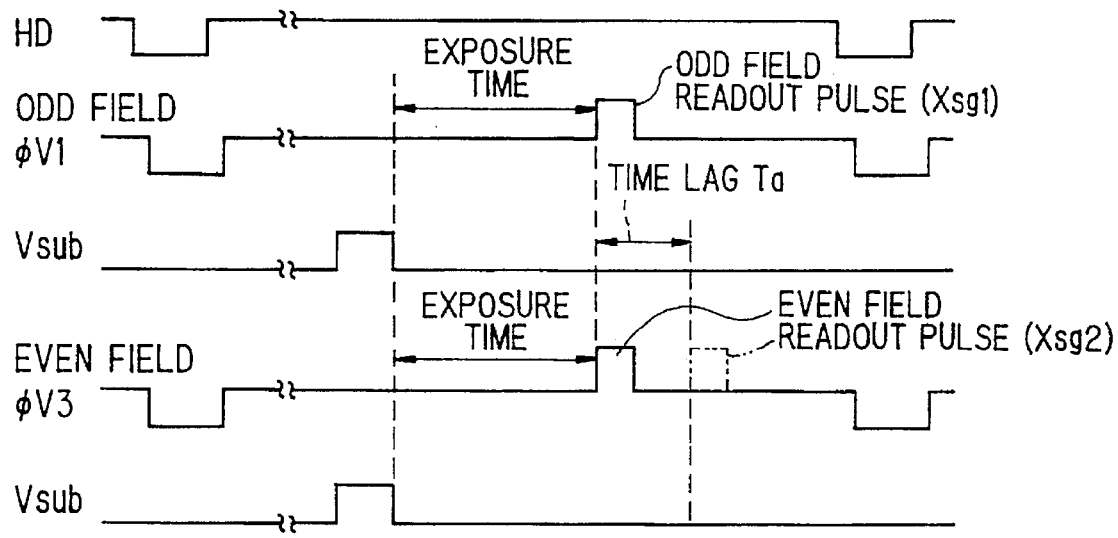
FIG. 4 is a time chart for illustrating the operation of the control circuit shown in FIG. 3A in a frame storage system.
Figure 5:
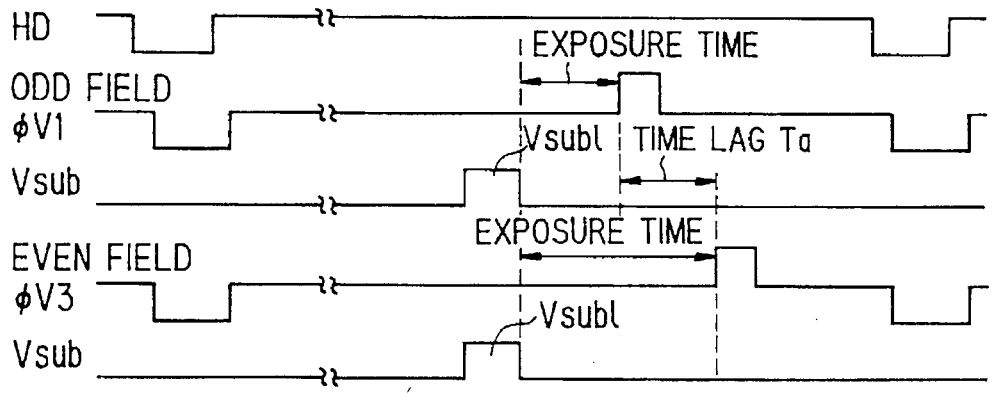
FIG. 5 is a time chart showing the operation in a frame storage in a conventional control circuit for a solid state image sensing device.
Figure 6:
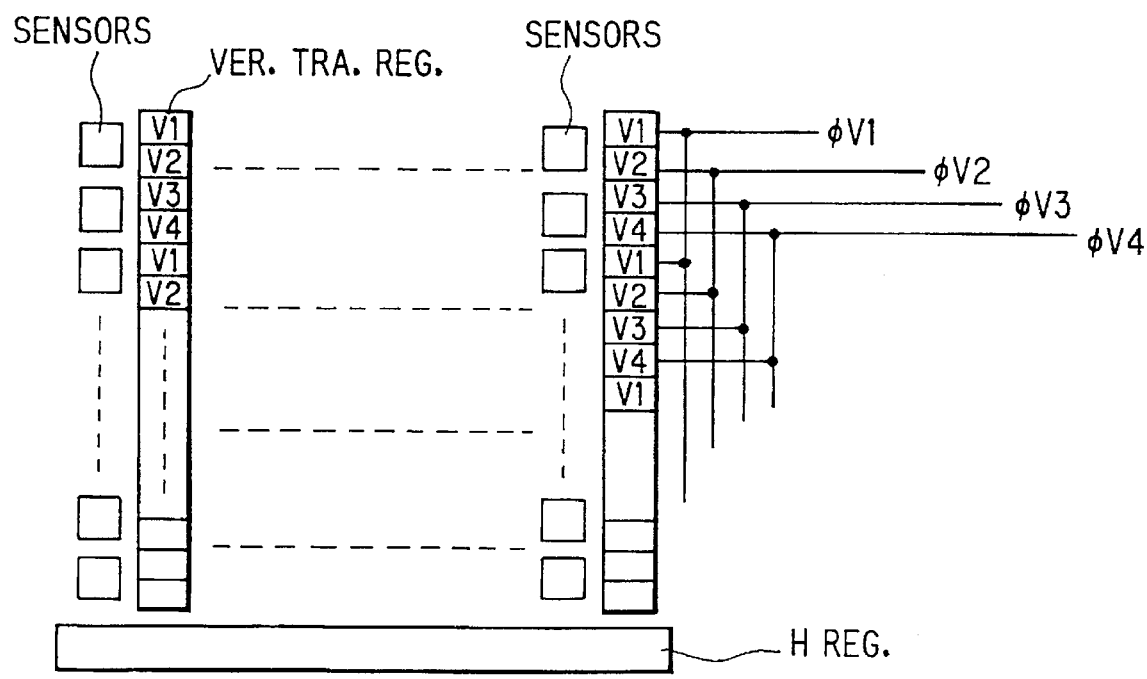
FIG. 6 is a schematic view showing the solid state image sensing device.

FIGS. 3A and 3B show a control circuit for a solid state image sensing device in accordance with another embodiment of the invention. FIG. 3A is a block diagram thereof and FIG. 3B is a time chart of a readout gate pulse. FIG. 4 is a time chart for illustrating the operation in the frame storage.

In accordance with this embodiment, without any offset of timing of the shutter pulse Vsub in the even field in the frame storage as in the embodiment shown in FIG. 1, the pulse generation timing is adjusted so that the generation times are identical with each other in the field between the readout gate pulse in the even field and the readout gate pulse in the odd field to thereby cancel a time lag in signal charge storage between the odd field and the even field.

Some of components used in this embodiment are common with those shown in FIG. 1. Explanation will be given only to the difference. Reference numeral 15 denotes a first pulse generating circuit and reference numeral 16 denotes a second pulse generating circuit. A first pulse and a second pulse generated by the two pulse generating circuit 15 and 16, respectively, are offset by the above-described time Ta in each field. On the basis of these pulses, an odd field readout gate pulse Xsg1 and an even field readout gate pulse Xsg2 are produced by an odd row readout gate pulse generating circuit 18 and an even row readout gate pulse generating circuit 19, respectively. Then, the odd row readout gate pulse Xsg1 and the even row readout gate pulse Xsg2 are combined with a vertical pulse and applied to a vertical transfer electrode of the solid state image sensing device.

Reference numeral 17 denotes a selector which receives as input signals an output of the first pulse generating circuit 15 and an output of the second pulse generating circuit 16 and receives a field/frame switching signal as a control signal. The selector 17 outputs the output of the first pulse generating circuit 15, i.e., the first pulse in the field storage, and outputs the outputs of the second pulse generation circuit 16, i.e., the second pulse in the frame storage.

The output of the selector 17 is inputted into the even row readout gate pulse generating circuit 19. Accordingly, as shown in FIG. 3B, the odd row readout gate pulse Xsg1 outputted from the odd row readout gate pulse generating circuit 18 and the even row readout gate pulse Xsg2 outputted from the even row readout gate pulse generating circuit 19 are offset by a time lag Ta in the field storage. However, in the frame storage, the output of the first pulse generating circuit 15 is inputted into the odd row readout gate pulse generating circuit 18 and the even row readout gate pulse generating circuit 19 to produce the gate pulses Xsg1 and Xsg2. Accordingly, in this case, the gate pulse Xsg1 AND Xsg2 are generated at the same timing in the field.

As a result, it is possible to correct a time lag in signal charge storage due to the generation timing of the readout gate pulses between the odd field and the even field in the frame storage, which leads to the prevention of the flicker.

More specifically, as is apparent from FIG. 4 showing an operation of the control circuit for the solid state sensing device shown in FIG. 3, the even field readout gate pulse Xsg2 which would be delayed in the field in the conventional system as indicated by two-dotted lines is generated at the same timing as that of the odd field readout gate pulse Xsg1. Accordingly, the signal charge storage time may be exactly kept constant between the odd field and the even field. As a result, it is possible to prevent the generation of flicker.

As described above, the control circuit for the solid state imaging device is characterized in that, the storage time adjusting circuit is provided for correcting a time lag in signal charge storage times between the pixels of the even and odd rows in reading the signal charges in the frame storage system.

Accordingly, with the storage time adjusting circuit in such a control circuit for the solid state image sensing device, it is possible to correct the time lag in signal charge storage time between the pixels of the even and odd rows in the frame storage system so that the signal charge storage times are kept constant between the pixels of the even and odd rows to thereby eliminate any undesired flicker.

Also, as described above, according to the present invention, in the control circuit for the solid state image sensing device, a delay circuit is provided for delaying the shutter pulse corresponding to the time lag of the signal charge storage time between the pixels of the even and odd rows in each field period in a field in which the timing of generation of the readout pulse is delayed in the frame storage.

Accordingly, with such a control circuit, in the field in which the timing of generation of the readout pulse is delayed, the timing of the generation of the shutter pulse is delayed corresponding to a time lag of the signal charge storage time generated between the pixels of the even and odd rows so that the signal charge storage times are kept at the same between the odd field and the even field to thereby eliminate flicker.

As described above, the control circuit for the solid state image sensing device includes a pulse generator for generating a first pulse at a predetermined timing in each field, a second pulse generator for generating a second pulse at a timing different from the aforesaid timing in each field, an odd row readout pulse generator for receiving the first pulse and reading out signal charges, a selector for receiving the first and second pulse and a field/frame identifying signal and for generating the second pulse in the field storage and the first pulse in the frame storage, and an even row readout pulse generator receiving the output of the selector and for generating an even row readout pulse for reading out the signal charges of the even row pixels.

Accordingly, with such a control circuit, since the second pulse is outputted from the selector in the field storage, the even row readout gate pulse is produced on the basis of the second pulse and the odd row readout gate pulse is produced on the basis of the first pulse, whereby it is possible to offset the even row readout gate pulse and the odd row readout gate pulse. On the other hand, in the frame storage, since the first pulse is outputted from the selector, the signal charge storage time readout gate pulse and the odd row readout gate pulse are generated at the same timing. Accordingly, there is no fear of generation of flicker. Accordingly, it is possible to read out the signals without causing any adverse affect in both the field storage and the frame storage.

What is claimed is:

1. An image sensing system comprising:
   a solid state image sensing device including a plurality of rows and columns of photo sensors, wherein odd rows of said photo sensors generate odd signal charges and even rows of said photo sensors generate even signal charges, outputting means for reading out said odd and even signal charges from said photo sensors and outputting said odd and even signal charges, and an electronic shutter;
   a readout pulse generator for generating first and second readout pulses with a time lag due to a first field reading mode therebetween;
   a shutter pulse generator for generating shutter pulses;
   operating means having:
   (a) said first field reading mode for causing said outputting means to simultaneously read out, in odd and even fields, odd and even signal charges in each field, wherein said odd signal charges are read out in accordance with said first readout pulses and said even signal charges are read out in accordance with said second readout pulses, and
   (b) a second frame reading mode for causing said outputting means to sequentially read out in frames said odd signal charges in odd fields in accordance with a selected one of said first and second readout pulses and to read out in even fields only said even signal charges in accordance with said selected one of said first and second readout pulses; and
   exposure time controlling means for controlling application of said shutter pulses to said electronic shutter and selective application of said first and second readout pulses so that exposure times of said odd and even fields are equal in the second frame reading mode.

2. The system according to claim 1, further comprising means for generating a mode signal representative of one of said first field reading mode and said second frame reading mode.

3. The system according to claim 2, further comprising selecting means for receiving said mode signal and said first and second readout pulses and selectively outputting of said one of first and second readout pulses for reading out said odd and even rows in said second frame reading mode.

4. An image sensing system comprising:
   a solid state image sensing device including a plurality of rows and columns of photo sensors, wherein odd rows of said photo sensors generate odd signal charges and even rows of said photo sensors generate even signal charges, outputting means for reading out said odd and even signal charges from said photo sensors and outputting odd and even signal charges, and an electronic shutter;
   a readout pulse generator for generating first and second readout pulses with a time lag due to a first field reading mode therebetween;
   a shutter pulse generator for generating first and second shutter pulses, wherein said first and second shutter pulses have substantially the same time lag therebetween as said time lag between first and second readout pulses;
   operating means having:
   (a) said first field reading mode for causing said outputting means to simultaneously read out, in odd and even fields, odd and even signal charges in each field, wherein said odd signal charges are read out in accordance with said first readout pulses and said even signal charges are read out in accordance with said second readout pulses, and
   (b) a second frame reading mode for causing said outputting means to sequentially read out in frames said odd signal charges in odd fields in accordance with said first readout pulses and to read out in even fields only said even signal charges in accordance with said second readout pulses; and exposure time controlling means for controlling exposure times of said odd and even fields by controlling selective application of said first and second shutter pulses to said electronic shutter in said first field reading mode and controlling application of said first shutter pulses to said electronic shutter in each even field and said second shutter pulses to said electronic shutter in each odd field in said second frame reading mode such that said exposure times of said odd and even fields are equal.

5. The system according to claim 4, further comprising means for generating a mode signal representative of one of said first field reading mode and said second frame reading mode.

6. The system according to claim 5, further comprising selecting means for receiving said mode signal and said first and second shutter pulses and selectively outputting said first and second shutter pulses.

7. An image sensing system comprising:
   an electronic shutter;
   a solid state imaging device having rows and columns of pixels for receiving an image and generating image signals, a circuit operatively coupled to said electronic shutter and said solid state imaging device and configured to effect field and frame readout modes, wherein a time lag due to said said readout mode exists between a timing of read out of said image signals from said pixels in odd rows in a field period and a timing of reading out said image signals from said pixels in even rows in a field period; and
   correcting means in said circuit for correcting an exposure time lag caused by said time lags so that exposure times of said odd and even rows are equal in said frame readout mode.

8. The system according to claim 7, further comprising means for setting an exposure starting time.

9. The system according to claim 8, wherein said correcting means comprises a delay circuit for delaying said exposure starting time to generate a delayed exposure starting time.

10. The system according to claim 9, wherein said correcting means further comprises a selecting means for selecting one of said exposure starting time and said delayed exposure starting time.

11. A shutter control circuit for an electronic shutter for an imaging device having field and frame reading modes comprising:

a field identifying signal;

a shutter pulse generator for generating a shutter pulse for said electronic shutter;

a delayed shutter pulse generator for generating a delayed shutter pulse; and a selector receiving said shutter pulse and said delayed shutter pulse, and outputting one of said shutter pulse and said delayed shutter pulse in response to said field identifying signal, wherein said selector outputs one of said shutter pulse and said delayed shutter pulse when said identifying signal represents an odd field, and outputs the other of said shutter pulse and said delayed shutter pulse when said identifying signal represents an even field in said frame reading mode.

12. A shutter control circuit according to claim 11, wherein said delayed shutter pulse generator comprises a delay circuit for receiving said shutter pulse and generating said delayed shutter pulse.

13. A control circuit for an imaging device having field and frame readout modes comprising:

a shutter pulse generator for generating shutter pulses for an electronic shutter:

a first pulse generator for generating a first pulse;

a second pulse generator for generating a second pulse having a predetermined time lag due to said field readout mode relative to first said pulse;

a selector for receiving said first and second pulses and outputting a selected one of said first and second pulses responsive to a field/frame readout mode signal, wherein said selector outputs said first pulse when said field/frame readout mode signal represents said frame readout mode and outputs said second pulse when said field/frame readout mode signal represents said field readout mode;

an odd row readout pulse generator for receiving said first pulse to generate an odd row readout pulse to an odd row readout pulse output terminal; and an even row readout pulse generator for receiving the output of said selector to generate an even row readout pulse to an even row readout pulse output terminal.

14. An imaging sensing system having field and frame readout modes comprising:

a solid state imaging device having a plurality of pixels arranged in rows and columns for receiving light thereby to generate signal changes, and a readout means for reading out said signal charges from said pixels in odd rows responsive to an odd row readout pulse and from said pixels in even rows responsive to an even row readout pulse, and output means for outputting said signal charges, and an electronic shutter responsive to a selected one of a shutter pulse and a delayed shutter pulse, wherein there is a time lag due to said field readout mode between a timing of said odd row readout pulse relative to a field period and a timing of said even row readout pulses relative to a field period; and an exposure time control circuit comprising:
a field identifying signal;
a shutter pulse generator for generating said shutter pulse;
a delayed shutter pulse generator for generating said delayed shutter pulse and;
a selector receiving said shutter pulse and said delayed shutter pulse and outputting a selected one of said shutter pulse and said delayed shutter pulse responsive to said field identifying signal, wherein said selector outputs one of said shutter pulse and said delayed shutter pulse when said identifying signal represents an odd field, and outputs the other of said shutter pulses when said identifying signal represents an even field so as to equalize exposure times of said pixels in even rows and odd rows in said frame readout mode.

15. An image sensing system according to claim 14, wherein said delayed shutter pulse generator comprises a delay circuit for receiving said shutter pulse to output a delayed shutter pulse.

16. An image sensing system having field and frame readout modes comprising:

a solid state imaging device having a plurality of pixels arranged in rows and columns for receiving light thereby to generate signal charges, and a readout means for reading out said signal charges from said pixels in odd rows responsive to an odd row readout pulse and from said pixels in even rows responsive to an even row readout pulse, and output means for outputting said signal charges, and an electronic shutter responsive to a shutter pulse; and a readout control circuit comprising:
a first pulse generator for generating a first pulse;
a second pulse generator for generating a second pulse having a predetermined time lag due to said field readout mode relative to said first pulse;
a selector for receiving said first and second pulses and outputting a selected one of said first and second pulses responsive to a field/frame readout mode signal, wherein said selector outputs said first pulse when said field/frame readout mode signal represents said frame readout mode and outputs said second pulse when said field/frame readout mode signal represents said field readout mode;
an odd row readout pulse generator for receiving said first pulse to generate said odd row readout pulse; and an even row readout pulse generator for receiving the output of said selector to generate said even row readout pulse.

* * * * *